No. 796,390. PATENTED AUG. 1, 1905.
H. S. ANDERSON & J. W. BENNIE.
ORE DRESSING MACHINE.
APPLICATION FILED FEB. 2, 1905.

*Fig. 1.*

*Fig. 2.*

Witnesses

Inventors
HENRY S. ANDERSON
J. W. BENNIE
By their Attorneys

UNITED STATES PATENT OFFICE.

HENRY S. ANDERSON, OF SPRINGFIELD, MASSACHUSETTS, AND JOHN W. BENNIE, OF CLIFTON, ARIZONA TERRITORY.

ORE-DRESSING MACHINE.

No. 796,390.      Specification of Letters Patent.      Patented Aug. 1, 1905.

Original application filed May 17, 1903, Serial No. 157,842. Divided and this application filed February 2, 1905. Serial No. 243,830.

*To all whom it may concern:*

Be it known that we, HENRY S. ANDERSON, residing at Springfield, Hampden county, Massachusetts, and JOHN W. BENNIE, residing at Clifton, Graham county, Territory of Arizona, citizens of the United States, have invented certain new and useful Improvements in Ore-Dressing Machines, of which the following is a full, clear, and exact description.

Our invention relates to improvements in concentrating-jigs and similar apparatus, and has for its object to provide an ore-dressing machine in which expensive metallic screens are rendered more lasting without in any way interfering with the fundamental principles of construction or operation of the apparatus.

The principle on which all forms of jigs work is the tendency of a mixture of ore particles of approximate size but varying specific gravity to arrange itself in layers according to their specific gravities when given a motion of adjustment by means of a pulsating column of water or other concentrating liquid.

The type of concentrating-jig most generally used consists of a water-tank divided by a partition in the upper part thereof, which does not extend to the bottom. On one side the partition is fixed a horizontal metallic screen on which the sized ore is fed. On the other side of the partition is a loosely-working plunger or piston operated vertically by an eccentric crank or other reciprocating device. The action of the plunger is to cause a regular pulsation of the water through the metallic screen, so affecting the particles of ore resting thereon that the heavier particles settle down through the lighter and either discharge through the screen itself or by a suitable gate above the screen-level, while the lighter particles of rock move on horizontally, discharging over the side or end of the screen-frame. The metallic screens mentioned above are subject to great wear, partly due to the abrasion of the ore and partly to the corrosive action of acids, alkalies, or metallic salts present in the water used as a concentrating medium, and it is the object of our invention to prevent such wear. We accomplish this by making the screen the cathode or electronegative element of an electrolytic bath, substantially as shown in the drawings, made a part of this application.

In the drawings, Figure 1 is a vertical section of a concentrating-jig embodying our invention. Fig. 2 is a plan view of the same.

Referring more particularly to the drawings, A is the tank containing the water or other concentrating liquid, which when ore is being treated contains acids and metallic salts derived from the ore. B is a partition in the upper part thereof extending toward the bottom and braced by a cross-bar B'.

C is the metallic ore-bed screen, upon which the ore to be concentrated is deposited.

D is the plunger or piston working on the other side of the partition B with a reciprocating motion derived from the eccentric E upon the shaft E'.

F is a discharge-pipe normally closed for drawing off the concentrating liquid.

G is a slanting bottom in the tank.

H is an electrode located below the screen C. The electrode H is of some material such as graphite or other suitable conducting material and is connected to one terminal of an external source of continuous current K, while the screen is connected to the other terminal of said source in such a way that the screen becomes the cathode or electronegative element and the electrode H the anode or the electropositive element. With this arrangement the screen is protected against corrosion, hydrogen being set free at its surface and the metallic salts in the solution being decomposed, so that the metal is electrolytically deposited upon the screen. When the concentrating liquid contains sulfuric acid and sulfate of copper, as is the case when treating ores containing sulfid of copper, such acid and salt being produced by the action of water in the liquid upon the ores, copper is electrolytically deposited upon the screens. This deposit is formed in opposition to the abrasive action of the ore, and to the extent of the deposit the abrasive action on the original screen is reduced, while the deposit on parts not subject to abrasive action builds up and strengthens the screen. By this means we are able to protect the screen entirely from electrolytic corrosion and also to reduce the loss due to abrasive action.

We have found that our invention makes it possible to use steel-wire or punched-steel screens, many times less expensive than brass or copper, and that when brass and copper screens are used the life of such screens is materially increased.

We have used our invention particularly in ore-dressing machines used for treating sulfate-of-copper ores and have found it of great value in that connection.

This application is a division of our former application, Serial No. 157,842, filed May 19, 1903.

What we claim is—

1. In an ore-dressing machine, the combination of a containing vessel, a metallic ore-bed screen therein forming an electrode, an electrolytic liquid containing in solution a salt of the metal of the ore treated and submerging said screen, means for causing said liquid to pass and repass through said screen, a second electrode in said vessel submerged in said liquid, and a source of electric current having its terminals connected to said electrodes, respectively, so as to maintain said screen in an electronegative condition relatively to said second electrode.

2. In a concentrating-jig, a metallic ore-bed screen, a carbon electrode, a concentrating liquid, said screen and electrode being so located as to be submerged by the concentrating liquid, said liquid containing in solution a salt of the metal of the ore treated, and a source of continuous current having its terminals connected to said screen and said electrode, respectively, so as to maintain said screen in an electronegative condition relatively to said carbon electrode.

Signed at New York city, New York, this 31st day of January, 1905.

HENRY S. ANDERSON.
JOHN W. BENNIE.

Witnesses:
A. G. SHAW,
A. HOWARD.

---

It is hereby certified that in Letters Patent No. 796,390, granted August 1, 1905, upon the application of Henry S. Anderson, of Springfield, Massachusetts, and John W. Bennie, of Clifton, Arizona Territory, for an improvement in "Ore-Dressing Machines," an error appears in the printed specification requiring correction, as follows: In the heading the words and figures "Original application filed May 17, 1903," should read *Original application filed May 19, 1903;* and that the said Letters Patent should be read with this correction therein that the same may conform to the record of the case in the Patent Office.

Signed and sealed this 23d day of January, A. D., 1906.

[SEAL.]

F. I. ALLEN,
*Commissioner of Patents.* or copper, and that when brass and copper screens are used the life of such screens is materially increased.

We have used our invention particularly in ore-dressing machines used for treating sulfate-of-copper ores and have found it of great value in that connection.

This application is a division of our former application, Serial No. 157,842, filed May 19, 1903.

What we claim is—

1. In an ore-dressing machine, the combination of a containing vessel, a metallic ore-bed screen therein forming an electrode, an electrolytic liquid containing in solution a salt of the metal of the ore treated and submerging said screen, means for causing said liquid to pass and repass through said screen, a second electrode in said vessel submerged in said liquid, and a source of electric current having its terminals connected to said electrodes, respectively, so as to maintain said screen in an electronegative condition relatively to said second electrode.

2. In a concentrating-jig, a metallic ore-bed screen, a carbon electrode, a concentrating liquid, said screen and electrode being so located as to be submerged by the concentrating liquid, said liquid containing in solution a salt of the metal of the ore treated, and a source of continuous current having its terminals connected to said screen and said electrode, respectively, so as to maintain said screen in an electronegative condition relatively to said carbon electrode.

Signed at New York city, New York, this 31st day of January, 1905.

HENRY S. ANDERSON.
JOHN W. BENNIE.

Witnesses:
A. G. SHAW,
A. HOWARD.

---

It is hereby certified that in Letters Patent No. 796,390, granted August 1, 1905, upon the application of Henry S. Anderson, of Springfield, Massachusetts, and John W. Bennie, of Clifton, Arizona Territory, for an improvement in "Ore-Dressing Machines," an error appears in the printed specification requiring correction, as follows: In the heading the words and figures "Original application filed May 17, 1903," should read *Original application filed May 19, 1903;* and that the said Letters Patent should be read with this correction therein that the same may conform to the record of the case in the Patent Office.

Signed and sealed this 23d day of January, A. D., 1906.

[SEAL.]

F. I. ALLEN,
*Commissioner of Patents.*

It is hereby certified that in Letters Patent No. 796,390, granted August 1, 1905, upon the application of Henry S. Anderson, of Springfield, Massachusetts, and John W. Bennie, of Clifton, Arizona Territory, for an improvement in "Ore-Dressing Machines," an error appears in the printed specification requiring correction, as follows: In the heading the words and figures "Original application filed May 17, 1903," should read *Original application filed May 19, 1903;* and that the said Letters Patent should be read with this correction therein that the same may conform to the record of the case in the Patent Office.

Signed and sealed this 23d day of January, A. D., 1906.

[SEAL.]

F. I. ALLEN,
*Commissioner of Patents.*